United States Patent [19]

Nishimura

[11] Patent Number: 5,774,429
[45] Date of Patent: Jun. 30, 1998

[54] MAGNETO-OPTICAL RECORDING MEDIUM, AND INFORMATION RECORDING/REPRODUCTION METHOD USING THE MEDIUM

[75] Inventor: Naoki Nishimura, Tokyo, Japan

[73] Assignee: Canon Kabushiki Kaisha, Tokyo, Japan

[21] Appl. No.: 812,308

[22] Filed: Mar. 5, 1997

Related U.S. Application Data

[62] Division of Ser. No. 389,767, Feb. 16, 1995, abandoned.

[30] Foreign Application Priority Data

Feb. 18, 1994 [JP] Japan ................................ 6-020761

[51] Int. Cl.⁶ .................................................. G11B 11/00
[52] U.S. Cl. ...................................... 369/13; 428/694 EC
[58] Field of Search ................................... 369/13, 275.2, 369/14, 275.3, 110; 360/59, 114, 131; 365/122; 428/694 ML, 694 MT, 694 MM, 694 EC, 694 SC, 694 RE

[56] References Cited

U.S. PATENT DOCUMENTS

| | | | |
|---|---|---|---|
| 5,094,925 | 3/1992 | Ise et al. | 428/694 |
| 5,168,482 | 12/1992 | Aratani et al. | |
| 5,208,799 | 5/1993 | Nakao et al. | 369/110 |
| 5,265,074 | 11/1993 | Ohta et al. | 369/13 |
| 5,278,810 | 1/1994 | Takahashi et al. | 369/13 |
| 5,420,833 | 5/1995 | Tanaka et al. | 369/13 |
| 5,428,585 | 6/1995 | Hirokane et al. | 369/13 |
| 5,452,272 | 9/1995 | Murakami et al. | 369/13 |
| 5,486,395 | 1/1996 | Murakami et al. | 428/64.3 |
| 5,493,545 | 2/1996 | Matsumoto et al. | 369/13 |
| 5,615,182 | 3/1997 | Murakami et al. | 369/13 |
| 5,623,458 | 4/1997 | Matsumoto et al. | 369/13 |
| 5,631,096 | 5/1997 | Nakajima et al. | 369/13 X |

FOREIGN PATENT DOCUMENTS

| | | | |
|---|---|---|---|
| 509836 | 10/1992 | European Pat. Off. | G11B 11/10 |
| 637019 | 2/1995 | European Pat. Off. | G11B 11/10 |
| 393058 | 4/1991 | Japan . | |

Primary Examiner—Ali Neyzari
Attorney, Agent, or Firm—Fitzpatrick, Cella, Harper & Scinto

[57] ABSTRACT

A magneto-optical recording medium includes a substrate on which light is incident, a first magnetic layer provided at the substrate side, and a second magnetic layer provided on the first magnetic layer. The first magnetic layer is an in-plane magnetization film at room temperature and becomes a perpendicular magnetization film at a temperature between room temperature and a Curie temperature thereof. The second magnetic layer has a Curie temperature lower than that of the first magnetic layer and is a perpendicular magnetization film. The direction of magnetization of the first magnetic layer is anti-parallel to the direction of magnetization of the second magnetic layer in a state in which the first magnetic layer and second magnetic layer are stable with respect to each other by exchange-coupling.

2 Claims, 13 Drawing Sheets (1) UPON IRRADIATION WITH PL (a)

(2) UPON IRRADIATION WITH PH (b)  (c)  (d)

TEMPERATURE DISTRIBUTION

→ TEMPERATURE (1) UPON IRRADIATION WITH PL (a)

(2) UPON IRRADIATION WITH PH (b)　　　(c)　　　(d)

TEMPERATURE DISTRIBUTION

MAGNETO-OPTICAL RECORDING MEDIUM, AND INFORMATION RECORDING/REPRODUCTION METHOD USING THE MEDIUM

This application is a division of application Ser. No. 08/389,767 filed Feb. 16, 1995, now abandoned.

BACKGROUND OF THE INVENTION

1. Field of the Invention

The present invention relates to a magneto-optical recording medium on/from which information is recorded/reproduced by a laser beam by utilizing a magneto-optical effect, and an information recording/reproduction method using the medium.

2. Related Background Art

As a rewritable high-density recording method, a magneto-optical recording medium on which information is recorded by writing magnetic domains on a magnetic. thin film using heat energy of a semiconductor laser, and from which the information is read out using the magneto-optical effect has received a lot of attention.

In recent years, demand has arisen for realizing a larger-capacity recording medium by increasing the recording speed of the magneto-optical recording medium.

The line recording density of an optical disk such as a magneto-optical recording medium largely depends on the laser wavelength of a reproduction optical system and the numerical aperture of an objective lens. More specifically, when the wavelength $\lambda$ of the reproduction optical system and the numerical aperture NA of the objective lens are determined, the diameter of the beam waist is determined. For this reason, the lower limit of a mark period which can be reproduced and detected is about $\lambda/2NA$. On the other hand, the track density is mainly limited by crosstalk. The crosstalk is mainly determined by the distribution (profile) of a laser beam on the medium surface, and is expressed by a function of $\lambda/2NA$ as in the mark period. Therefore, in order to realize a high density conventional optical disk, the wavelength of a laser of the reproduction optical system must be shortened, and the numerical aperture NA of the objective lens must be increased. However, it is not easy to shorten the wavelength of the laser due to problems associated with efficiency, heating, and the like of elements. On the other hand, when the numerical aperture of the objective lens is increased, the distance between the lens and the disk becomes too small, and a mechanical problem such as a collision occurs.

For these reasons, a technique for increasing the recording density by magnetic super-resolution by modifying the arrangement or the reading method of a recording medium has been developed. For example, in Japanese Laid-Open Patent Application No. 3-93058, after the direction of magnetization of a reproducing layer is aligned in one direction using an initialization magnetic field before reproduction of a signal, a signal held in a recording layer is transferred to the reproducing layer while applying a reproducing magnetic field so as to reduce intersymbol interference upon reproduction, and to allow reproduction of a signal having a period smaller than the diffraction limit of light, thereby improving the line recording density and the track density.

Also, in recent years, demand has arisen for increasing the recording speed.

The conventional recording method for a magneto-optical recording method requires three processes (erasure of old data, recording of new data, and verification of whether or not new data is normally recorded) upon recording. For this reason, the disk must complete three revolutions to rewrite information, and requires a long time to rewrite information accordingly.

For this reason, overwrite methods (an optical modulation method and a magnetic field modulation method) for directly recording new data on old data by omitting the erasure process from the three processes have been proposed and extensively studied. Of these methods, the magnetic field modulation method cannot increase the recording capacity by adhering two disks to each other since a magnetic field must be applied from a side opposite to the light incidence side, and the magnetic modulation speed of a magnetic head is limited. For these reasons, it is difficult to increase the recording speed.

On the other hand, the optical modulation method performs recording by forming magnetic domains by modulating a laser beam. In this method, two media can be adhered to each other to achieve a large capacity, and the switching speed of a laser is higher than the magnetic field modulation speed of the magnetic head, thus easily increasing the recording speed.

Therefore, when information recording is performed by the optical modulation overwrite method, and information is reproduced by the above-mentioned super-resolution, a large amount of information can be recorded.

However, in the above-mentioned magneto-optical reproduction method based on the super-resolution, the direction of magnetization of the reproducing layer must be aligned in one direction before irradiation of a laser beam. For this reason, a magnet for initializing the reproducing layer must be added to the conventional apparatus. Therefore, this reproduction method suffers the following problems. That is, the magneto-optical recording apparatus is complicated, and has a high cost, it becomes difficult to achieve a compact structure, and so on.

In order to simultaneously achieve the super-resolution medium and the optical modulation overwrite technique, three or more magnetic layers in principle, and six or more magnetic layers in practice are required. Therefore, the layer structure is complicated, and it is difficult to reduce the cost and to improve the quality thereof.

SUMMARY OF THE INVENTION

The present invention has been made to solve the above-mentioned problems, and has as its object to provide a magneto-optical recording medium which requires neither an initialization magnetic field nor a reproduction magnetic field upon reproduction, has a simple layer structure constituted by two or more layers in principle, allows reproduction of a signal having a period equal to or smaller than the diffraction limit of light with a high S/N (C/N) ratio, and allows recording by the optical modulation overwrite method, and an information reproduction method and an information recording method using the medium.

In order to achieve the above object, there is provided a magneto-optical recording medium comprising:
  a substrate on which light is incident;
  a first magnetic layer which is provided at the substrate side, and which is an in-plane magnetization film at room temperature, and becomes a perpendicular magnetization film at a temperature between room temperature and a Curie temperature thereof; and
  a second magnetic layer which is provided on the first magnetic layer, and which has a Curie temperature lower than the Curie temperature of the first magnetic layer, and which is a perpendicular magnetization film, wherein a direction of magnetization of the first magnetic layer is anti-parallel to a direction of magnetization of the second magnetic layer in a state in which the first and second magnetic layers are stable with respect to each other by exchange-coupling.

There is also provided an information reproduction method for reproducing information recorded on a magneto-optical recording medium which comprises a substrate on which light is incident;

a first magnetic layer which is provided at the substrate side, which is an in-plane magnetization film at room temperature, and becomes a perpendicular magnetization film at a temperature between room temperature and a Curie temperature thereof, and a second magnetic layer which is provided on the first magnetic layer, which has a Curie temperature lower than the Curie temperature of the first magnetic layer, and which is a perpendicular magnetization film, and in which a direction of magnetization of the first magnetic layer is anti-parallel to a direction of magnetization of the second magnetic layer in a state in which the first and second magnetic layers are stable with respect to each other by exchange-coupling, the method comprising:

the step of irradiating the recording medium with a laser spot from the first magnetic layer side;

the step of changing the magnetization of the first magnetic layer corresponding to a local region in the laser spot to perpendicular magnetization;

the step of exchange-coupling the magnetizations of the first magnetic layer which has become a perpendicular magnetization film and the second magnetic layer, and transferring information recorded on the second magnetic layer to the first magnetic layer; and the step of reproducing the information transferred to the first magnetic layer by utilizing a magneto-optical effect.

There is also provided an information reproduction method for reproducing information recorded on a magneto-optical recording medium which comprises a substrate on which light is incident, a first magnetic layer which is provided at the substrate side, which is an in-plane magnetization film at room temperature, and becomes to a perpendicular magnetization film at a temperature between room temperature and a Curie temperature thereof, and a second magnetic layer which is provided on the first magnetic layer, which has a Curie temperature lower than the Curie temperature of the first magnetic layer, and which is a perpendicular magnetization film, and in which a direction of magnetization of the first magnetic layer is anti-parallel to a direction of magnetization of the second magnetic layer in a state in which the first and second magnetic layers are stable with respect to each other by exchange-coupling, the method comprising:

the step of applying a bias magnetic field to a portion of the medium;

the first type recording step of irradiating the medium with a laser spot of a power to increase the temperature of the medium to a temperature near the Curie temperature of the second magnetic layer to change the magnetization of the first magnetic layer to a perpendicular magnetization, and to orient the direction of magnetization of the first magnetic layer in a direction of the bias magnetic field, and orienting the direction of magnetization of the second magnetic layer in the direction of the bias magnetic field in a temperature dropping process;

the second type recording step of irradiating the medium with a laser spot of a power to increase the temperature of the medium to a temperature not less than the Curie temperature of the second magnetic layer to change the magnetization of the first magnetic layer to a perpendicular magnetization and to orient the direction of magnetization of the first magnetic layer in the direction of the bias magnetic field, and orienting the direction of magnetization of the second magnetic layer, which magnetization appears in the temperature dropping process, in a direction stable with respect to the direction of magnetization of the first magnetic layer; and the step of selecting one of the first and second type recording steps in accordance with recording information.

BRIEF DESCRIPTION OF THE DRAWINGS

FIGS. 3A to 3C are views showing an example of a reproduction method of the magneto-optical recording medium of the present invention, in which FIG. 3A is a view showing a mask region and an aperture region in a light spot on the medium surface, FIG. 3B is a view showing the state of the directions of magnetization of the respective layers, and FIG. 3C is a graph showing the temperature distribution in the track direction;

FIGS. 4A to 4C are views showing another example of the reproduction method of the magneto-optical recording medium of the present invention, in which FIG. 4A is a view showing a mask region and an aperture region in a light spot on the medium surface, FIG. 4B is a view showing the state of the directions of magnetization of the respective layers, and FIG. 4C is a graph showing the temperature distribution in the track direction;

DETAILED DESCRIPTION OF THE PREFERRED EMBODIMENTS

A magneto-optical recording medium and an information recording/reproduction method using the medium according to the present invention will be described in detail hereinafter with reference to the accompanying drawings.

Figure 1:
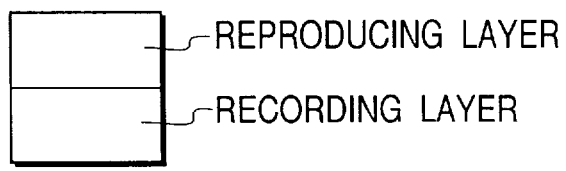
FIG. 1 is a sectional view showing an example of the basic structure of magnetic layers in a magneto-optical recording medium of the present invention.
Figure 2:
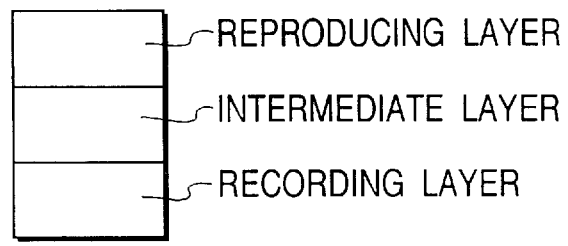
FIG. 2 is a sectional view showing another example of the basic structure of magnetic layers in the magneto-optical recording medium of the present invention.

A magneto-optical recording medium of the present invention has a structure having at least a first magnetic layer which is an in-plane magnetization film at room temperature and changes to a perpendicular magnetization film upon a temperature rise, and a second magnetic layer which is a perpendicular magnetization film (FIG. 1), or having a third magnetic layer which has a Curie temperature lower than those of the first and second magnetic layers between the first and second magnetic layers (FIG. 2). The first, second, and third magnetic layers will be respectively referred to as reproducing, recording, and intermediate layers hereinafter.

The reproducing layer is set to have a composition so that the layer is an in-plane magnetization film at room temperature, and becomes a perpendicular magnetization film at high temperatures. For this purpose, for example, a composition having a compensation temperature between room temperature and the Curie temperature, a large Ms (saturation magnetization) at room temperature, and small Ms at a reproducing temperature is selected. In this case, the reproducing layer is an in-plane magnetization film at room temperature since the demagnetizing energy $2\pi Ms^2$ is large. However, the reproducing layer becomes a perpendicular magnetization film at the reproducing temperature since Ms becomes small, and the perpendicular magnetic anisotropic energy becomes dominant over the demagnetizing energy.

As the material of the reproducing layer, a rare earth-iron group amorphous alloy such as GdCo, GdFeCo, GdTbFeCo, GdDyFeCo, NdGdFeCo, or the like is preferable. By "iron group" is here meant the elements iron, cobalt, and nickel. By adding a light rare earth element such as Nd, Pr, Sm, or the like, a reproduction output for short-wavelength light can be improved.

As the recording layer, a film which has large perpendicular magnetic anisotropy and can stably hold a magnetization state, e.g., a rare earth-iron group amorphous alloy film consisting of, e.g., TbFeCo, DyFeCo, TbDyFeCo, or the like; a garnet film; a platinum group-iron group periodic structure film such as Pt/Co, Pd/Co, or the like; a platinum group-iron group alloy film consisting of, e.g., PtCo, PdCo, or the like; or the like is preferable. By "platinum group" is here meant the elements Ru, Rh, Pd, Os, Ir, and Pt.

An element for improving corrosion resistance such as Cr, Al, Ti, Pt, Nb, or the like may be added to the reproducing layer and the recording layer.

As the material of the intermediate layer, for example, a rare earth-iron group amorphous alloy such as GdFeCo, GdTbFeCo, GdDyFeCo, TbFeCo, DyFeCo, DyTbFeCo, or the like is preferable.

The reproducing layer and/or recording layer must consist of a ferrimagnetic member, and the directions of magnetization of these layers must be anti-parallel to each other in a state wherein these layers are exchange-coupled at least during recording. For example, when a ferrimagnetic rare earth (RE) iron group element (TM) amorphous alloy is used in the reproducing layer and the recording layer, the composition of the reproducing layer is selected to have dominant rare earth element sublattice magnetization at the recording temperature, and the composition of the recording layer is selected to have dominant iron group element sublattice magnetization at the recording temperature; or vice versa (the arrangement constituted by these layers is normally called an anti-parallel arrangement).

Furthermore, in addition to the above-mentioned three layers, in order to enhance the interference effect, a layer consisting of a dielectric such as SiN, $AlO_x$, $TaO_x$, $SiO_x$, or the like may be arranged. Also, in order to improve thermal conductivity, a layer consisting of, e.g., Al, AlTa, AlTi, AlCr, Cu, or the like may be arranged.

Furthermore, in order to adjust the exchange-coupling force or magnetostatic coupling force, auxiliary layers such as a recording auxiliary layer, a reproducing auxiliary layer, and the like may be arranged. Moreover, a protective coat consisting of the dielectric layer or a polymer resin may be provided as a protective layer.

The recording/reproduction process of the present invention will be described below. FIGS. 3A to 3C and FIGS. 5 and 6 are associated with a recording medium without an intermediate layer, and FIGS. 4A to 4C and FIGS. 7 and 8 are associated with a recording medium with an intermediate layer.

The reproduction method of a recording signal will be explained below.

Figure 3A:
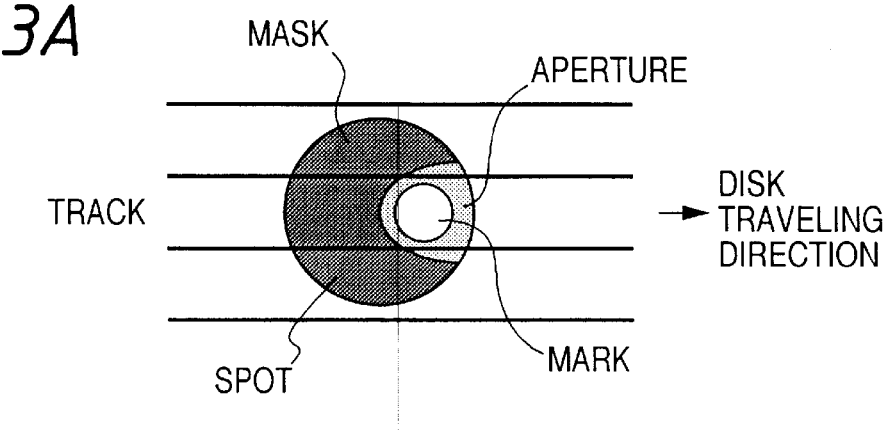
Figure 3B:
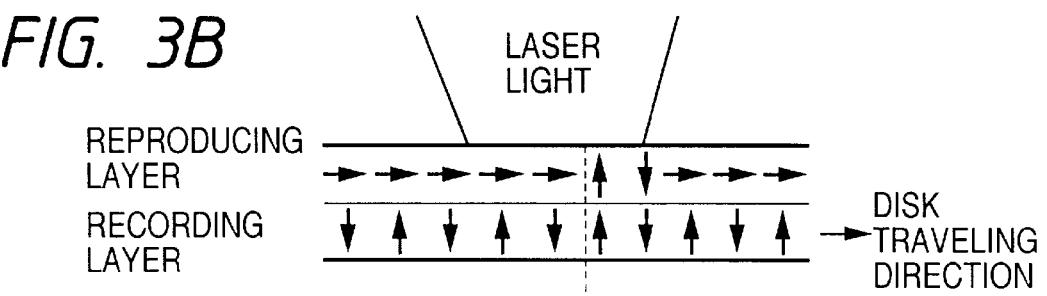
Figure 3C:
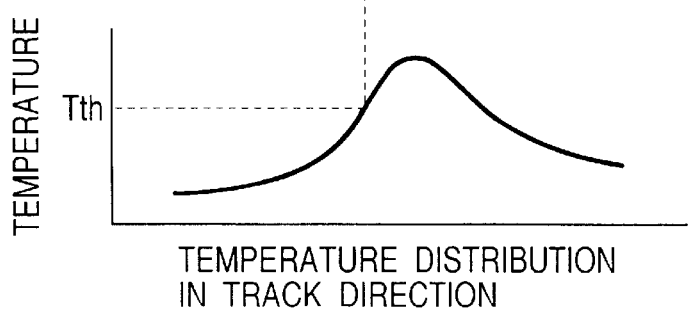
Figure 4A:
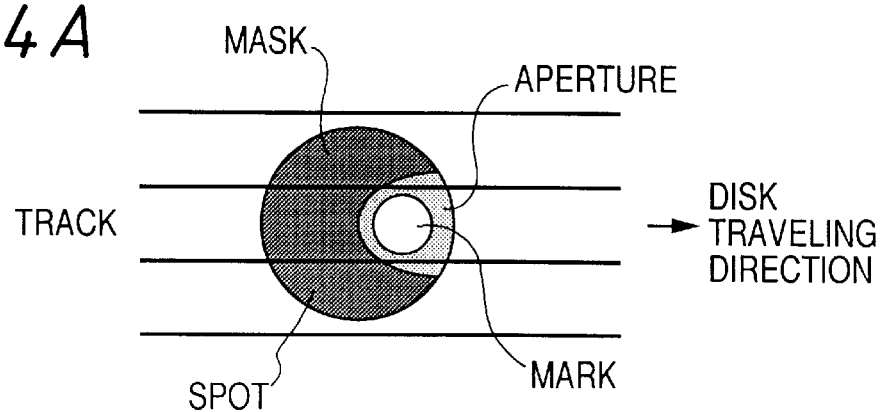
Figure 4B:
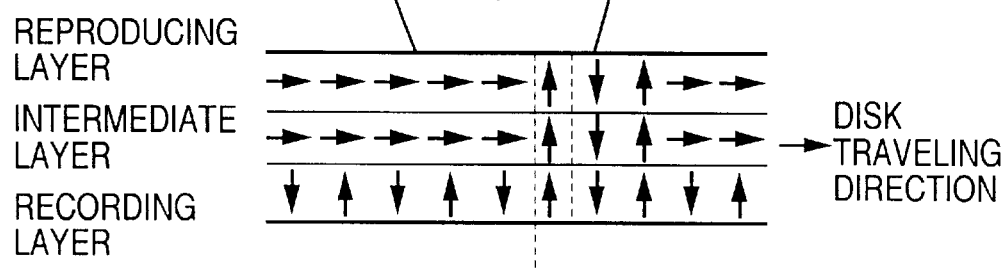
Figure 4C:
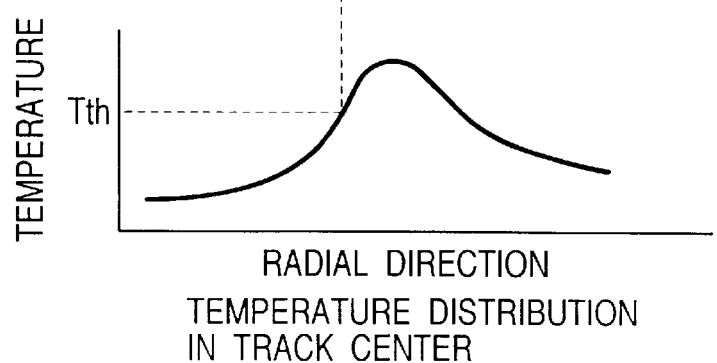

Upon reproduction, a light beam irradiates the medium, and at this time, the temperature of the irradiated portion rises. Since the medium moves at a constant speed, the temperature distribution on the medium has a pattern extending in the moving direction of the medium, as shown in FIGS. 3C and 4C, and includes a high-temperature portion in a local region in the light spot. When the reproducing layer is set to make the transition from an in-plane magnetization film to a perpendicular magnetization film at a low-temperature portion temperature Tr or higher, a state wherein only the high-temperature portion as the local region of the light spot of the reproducing layer becomes a perpendicular magnetization film portion, and most of the remaining portion remains an in-plane magnetization film portion as shown in FIGS. 3B and 4B. Since the reproducing layer portion, which has become a perpendicular magnetization film portion, is magnetically coupled to the recording layer by exchange-coupling, the magnetization of the recording layer is transferred to the reproducing layer portion. The transferred magnetic signal is converted into an optical signal by the magneto-optical effect of the reproducing layer upon detection of reflected light, and the optical signal is detected. Therefore, as shown in FIGS. 3A and 4A, since a portion of the light spot becomes an aperture region for transferring the magnetization of the recording layer, and the remaining portion becomes a mask region for optically shielding magnetization information of the recording layer, a signal having a period equal to or smaller than the diffraction limit of light can be reproduced.

Therefore, in the magneto-optical recording medium and the reproduction method of the present invention, magnetic super-resolution can be achieved without using an initialization magnetic field and a reproducing magnetic field.

In the above description, the reproducing layer and the recording layer are magnetically coupled to each other by the exchange-coupling effect. Alternatively, the recording layer and the reproducing layer may be magnetically coupled by magnetostatic coupling upon reproduction.

A method of overwriting new binary information on old information by irradiating a medium with a light beam, whose light intensity is modulated to two levels, i.e., a high level (PH) and a low level (PL) in accordance with recording information, onto the magneto-optical recording medium of the present invention will be described below with reference to FIGS. 5 to 8.

In the magneto-optical recording medium of the present invention, the reproducing layer and the recording layer constitute an anti-parallel arrangement in a state before the magnetization of the recording layer is stably held, and binary recording is attained by aligning the direction of magnetization of the recording layer in the direction of an external magnetic field or in a direction to be exchange coupled to the reproducing layer by two-level light intensity modulation upon recording.

Figure 11A:
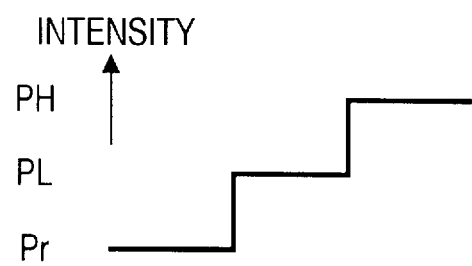
FIGS. 11A to 11D are waveform charts showing the intensities of a light beam upon recording and reproduction in the magneto-optical recording medium of the present invention.

The power values of light beams corresponding to two levels selected in accordance with recording information upon recording (of these beams, a light beam of low recording power will be referred to as PL light hereinafter, and a light beam of high recording power will be referred to as PH light hereinafter) must be set to be larger than that of a reproducing beam Pr, as shown in Fig. 11A, and these two beam power values must have a certain difference therebetween so as not to cause a recording error in consideration of variations of the powers of the light beams.

Figure 5:
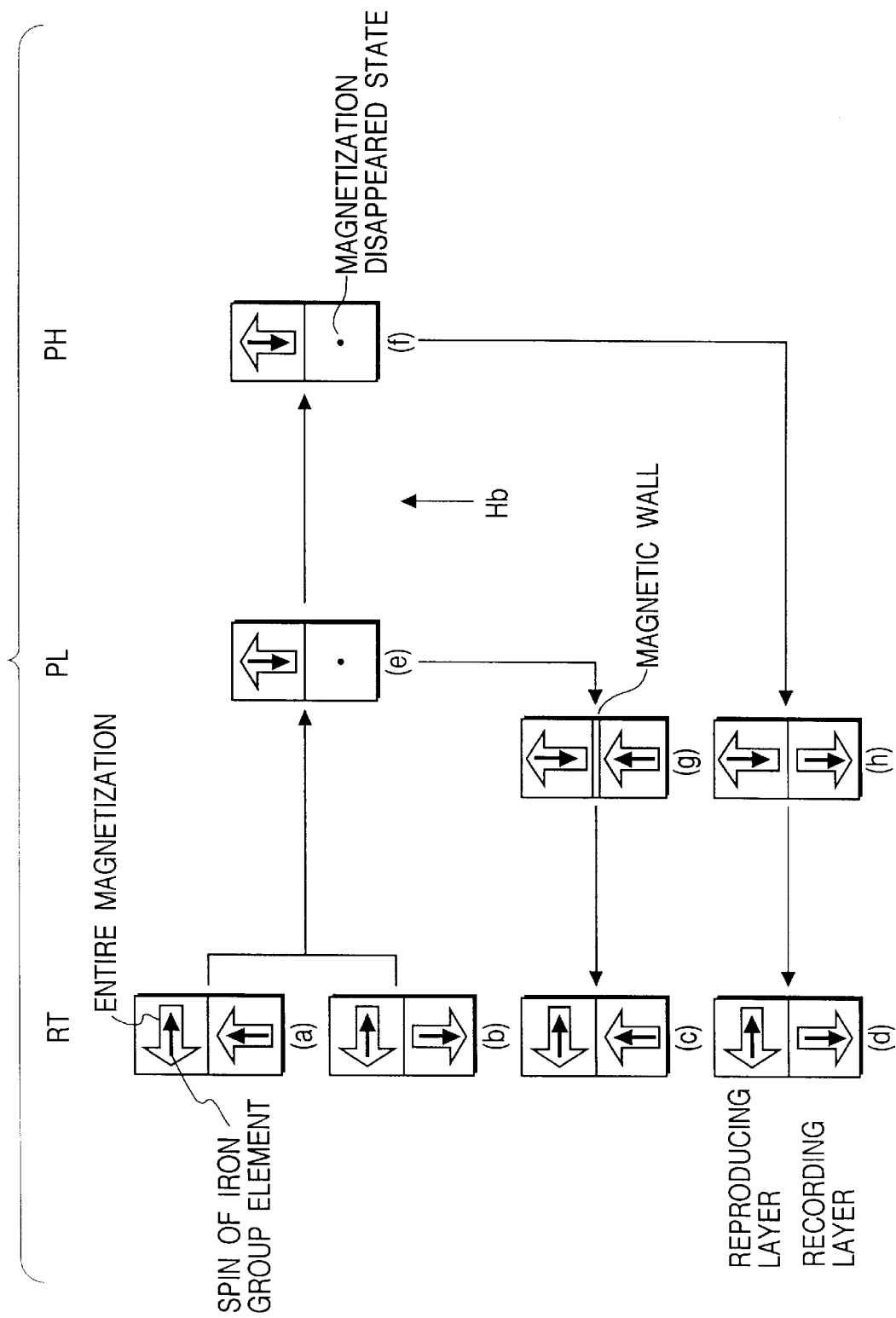
FIG. 5 is a view showing a change in state of magnetization upon information recording in one example of the magneto-optical recording medium of the present invention.
Figure 6:
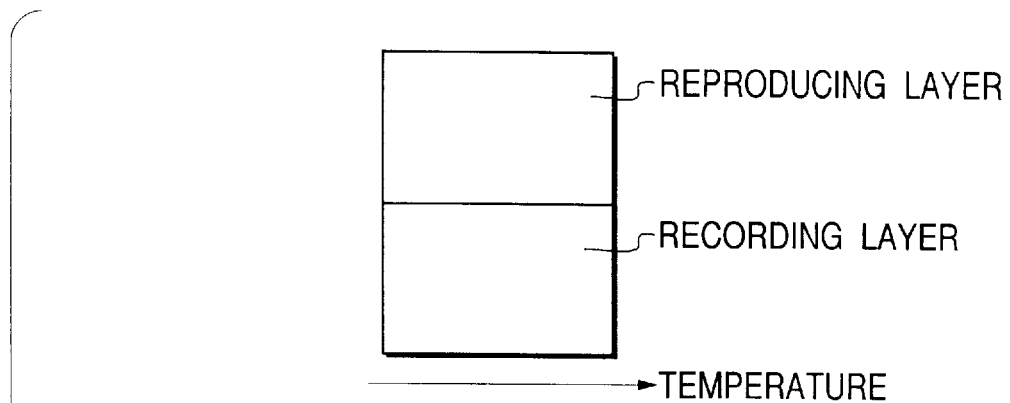
FIG. 6 is a graph showing the temperature distribution in the direction of film thickness upon information recording shown in FIG. 5.
Figure 6:
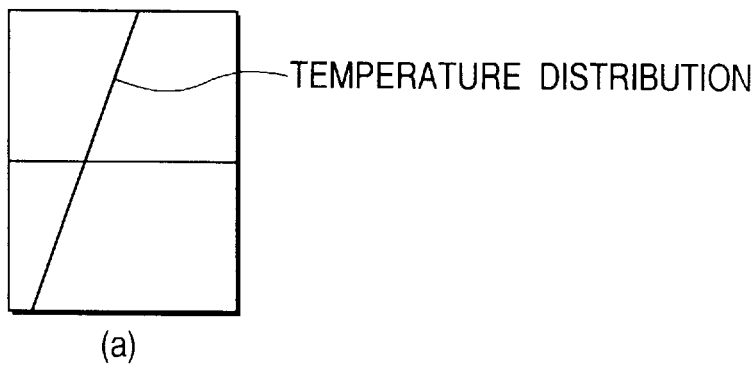
Figure 6:
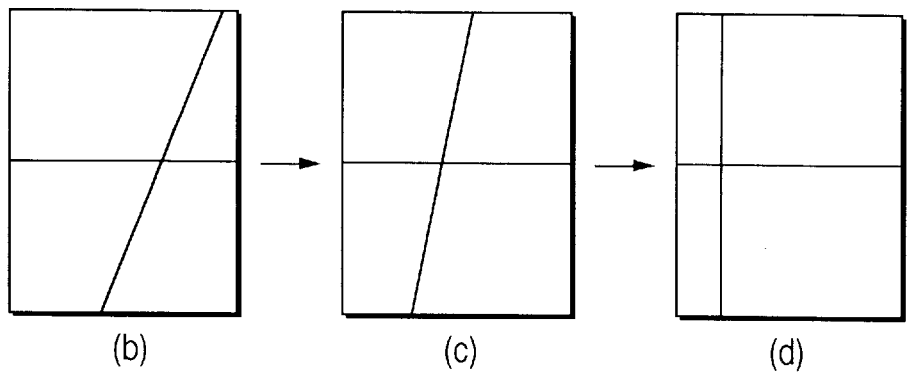

FIG. 5 shows the transition of magnetization states of the respective layers in a case wherein the reproducing layer consists of a rare earth-iron group transition metal amorphous alloy in which the rare earth element sublattice magnetization is dominant, and the recording layer consists of a rare earth-iron group transition metal amorphous alloy in which the iron group element sublattice magnetization is dominant. FIG. 6 shows the temperature distributions in the direction of film thickness when the medium temperature reaches a temperature at which the magnetization of the recording layer is stably held in a cooling process after irradiation of low recording power or high recording power.

A case (first type recording) will be explained below wherein PL light irradiates the medium while applying an external (bias) field Hb (for example, an upward magnetic field).

When PL light irradiates the medium in magnetization states (a) and (b) in FIG. 5, the temperature of the irradiated portion of the reproducing layer rises, the irradiated portion becomes a perpendicular magnetization film portion, and the direction of magnetization of this portion follows the direction of the bias magnetic field Hb, as shown in a state (e) in FIG. 5. At the same time, the temperature of the irradiated portion of the recording layer reaches a temperature near the Curie temperature. Thereafter, when the direction of magnetization of the irradiated portion of the recording layer is aligned in the direction of the bias magnetic field in a temperature dropping process, a magnetic wall is formed between the reproducing layer and the recording layer. If the influence of the exchange-coupling force by this magnetic wall is set to be smaller that of the bias magnetic field, the direction of magnetization of the irradiated portion of the recording layer is aligned in the direction of the bias magnetic field and remains stable, as shown in a state (g) in FIG. 5.

The condition of this process can be expressed by the following formula (I):

$$\sigma_w/(2Ms_2 \cdot h_2) - Hc_2 < Hb \quad (I)$$

where $\sigma_w$ is the magnetic wall energy between the reproducing layer and the recording layer, $Ms_2$ is the saturation magnetization of the recording layer, $h_2$ is the film thickness of the recording layer, and $Hc_2$ is the coercive force of the recording layer.

In this manner, upward magnetization is recorded in the irradiated portion of the recording layer, the irradiated portion of the reproducing layer becomes an in-plane magnetization film, and the medium temperature returns to room temperature (RT) (state (c) in FIG. 5).

A case (second type recording) will be explained below wherein PH light irradiates the medium while applying the bias magnetic field Hb.

When PH light is irradiated from the magnetization states (a) and (b) in FIG. 5 as in the above-mentioned case, the irradiated portion of the reproducing layer becomes a perpendicular magnetization film, and the direction of magnetization of this portion follows the direction of the bias magnetic field in the same manner as in the above-mentioned case upon irradiation of PL light, as shown in a state (f) in FIG. 5. The medium is then cooled, and the temperature of the irradiated portion of the recording layer drops to a temperature upon irradiation of PL light.

However, when PH light irradiates the medium, the time period from the irradiation of light until the temperature of the irradiated portion of the recording layer drops to the Curie temperature is long. For this reason, during this time period, heat radiation is caused in the direction of film thickness, and the temperature difference between the reproducing layer and the recording layer becomes almost zero (or is smaller than that upon irradiation of PL light ((b)→(c)→(d) of FIG. 6). Therefore, the interface temperature (to be referred to as TH hereinafter) between the reproducing layer and the recording layer in a state wherein the temperature of the irradiated portion of the recording layer drops to the Curie temperature after irradiation with PH light, and the magnetization of the recording layer is generated and held to become lower than the interface temperature (to be referred to as TL hereinafter) in the same case upon irradiation with PL light.

Figure 16:
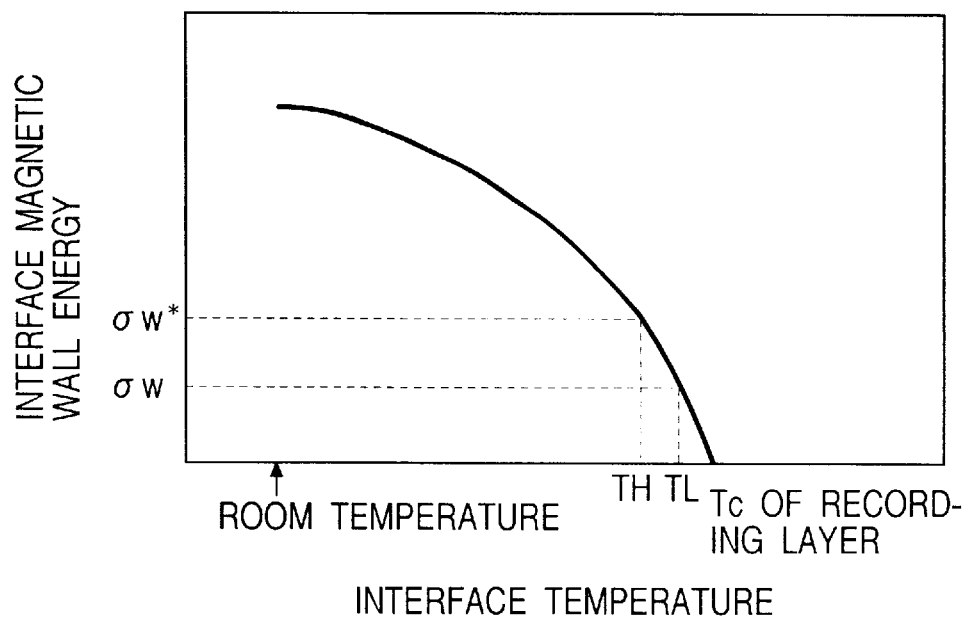
FIG. 16 is a graph showing the temperature dependence of interface magnetic wall energy.

The interface magnetic wall energy is related to the interface temperature, as shown in FIG. 16. For this reason, the interface magnetic wall energy becomes large ($\sigma_w^*$) upon irradiation of the medium with PH light, and becomes small ($\sigma_w$) upon irradiation of the medium with PL light. For this reason, upon irradiation of the medium with PH light, an effective magnetic field by exchange-coupling can be increased as compared to that upon irradiation of the medium with PL light. Therefore, as shown in a state (h) in FIG. 5, the direction of magnetization of the irradiated portion of the recording layer is not oriented in the direction of the bias field, and the recording layer is exchange-coupled to the reproducing layer, thus forming downward magnetization in the irradiated portion of the recording layer. The condition of this process is expressed by the following formula (II):

$$\sigma_w{}^*/(2Ms_2{}^* \cdot h_2{}^*) - Hc_2{}^* > Hb \quad (II)$$

where $\sigma_w{}^*$ is the magnetic wall energy between the reproducing layer and the recording layer at that time, $Ms_2{}^*$ is the saturation magnetization of the recording layer, $h_2{}^*$ is the film thickness of the recording layer, and $Hc_2{}^*$ is the coercive force of the recording layer.

In this manner, the downward magnetization is recorded in the irradiated portion of the recording layer, the irradiated portion of the reproducing layer becomes an in-plane magnetization film, and the medium temperature returns to room temperature (RT) (state (d) in FIG. 5).

A case will be explained below wherein the characteristics of the magneto-optical recording medium are improved by providing an intermediate layer in the medium. In this case, the reproduction and recording methods are basically the same as those in the above-mentioned two-layered structure. Note that the intermediate layer is located between the reproducing layer and the recording layer, and its Curie temperature $Tc^I$ is set to satisfy the following formula (III):

$$TH < Tc^I < TL \quad (III)$$

Figure 7:
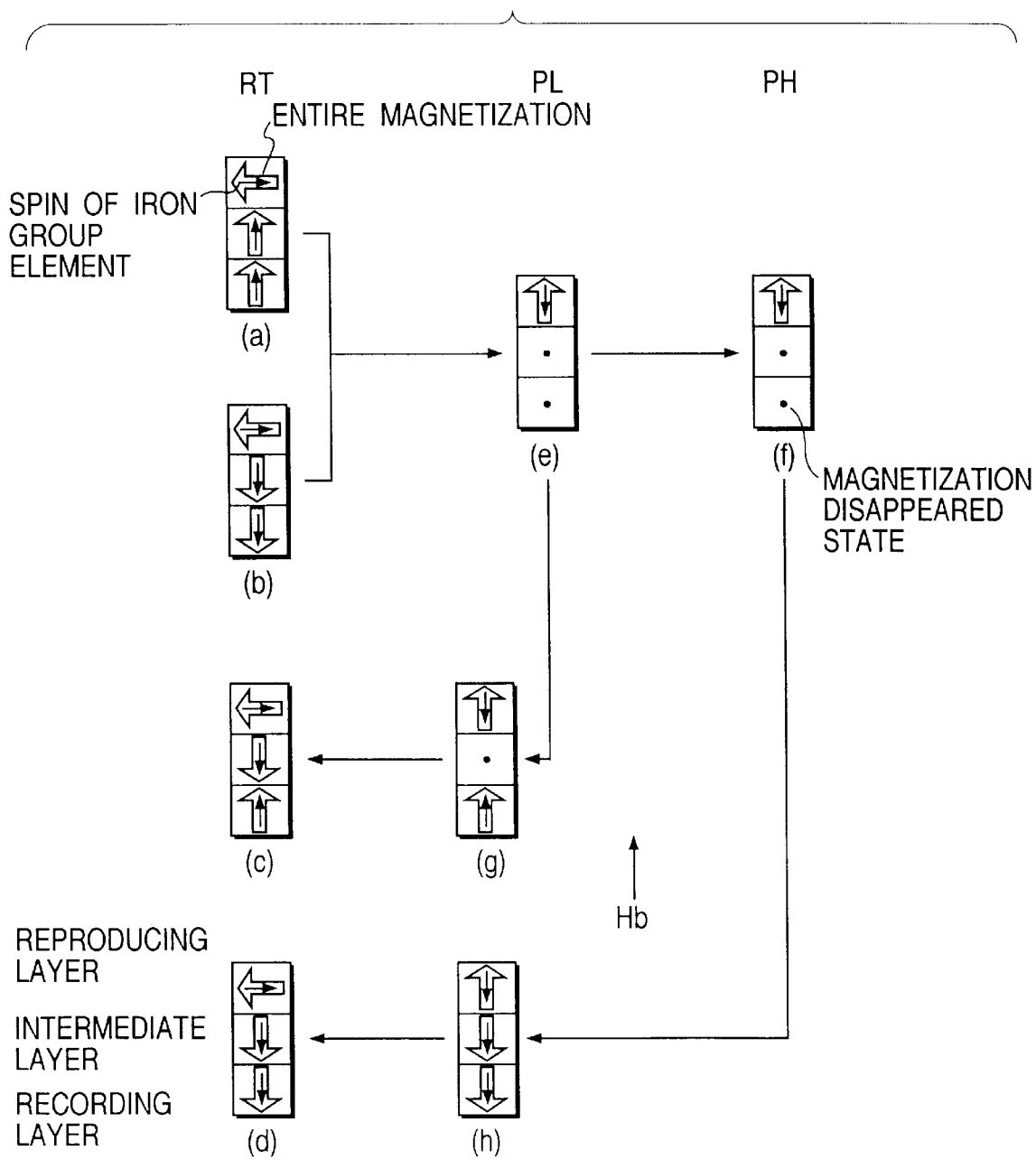
FIG. 7 is a view showing a change in state of magnetization upon information recording in another example of the magneto-optical recording medium of the present invention.
Figure 8:
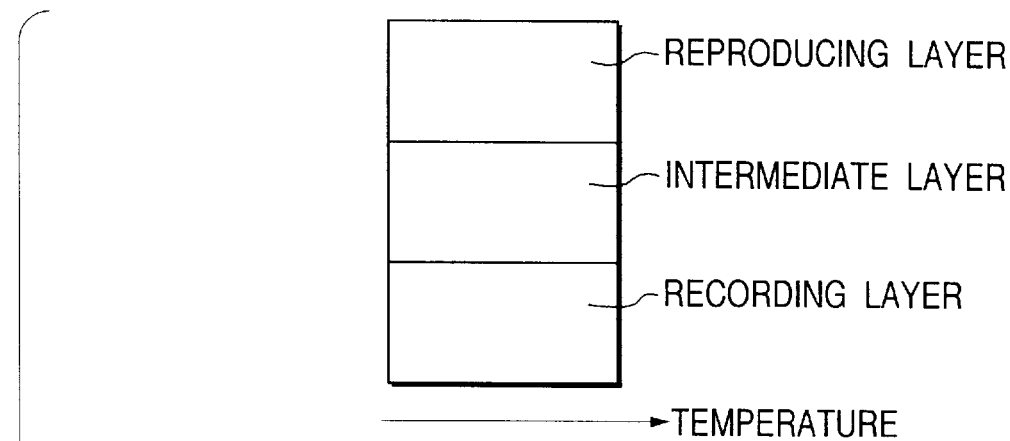
FIG. 8 is a graph showing the temperature distribution in the direction of film thickness upon information recording shown in FIG. 7.
Figure 8:
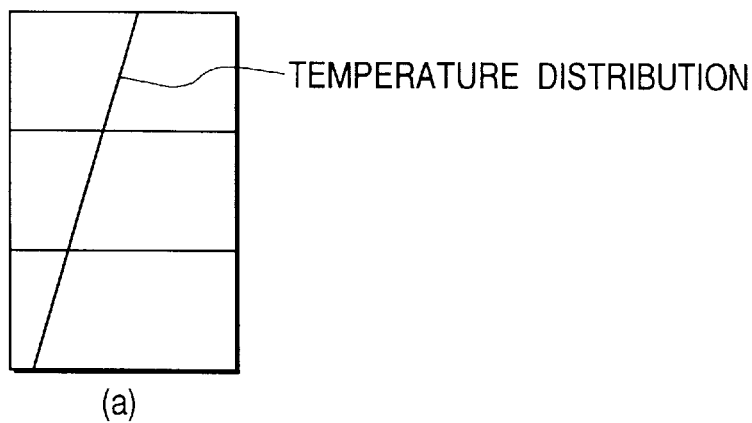
Figure 8:
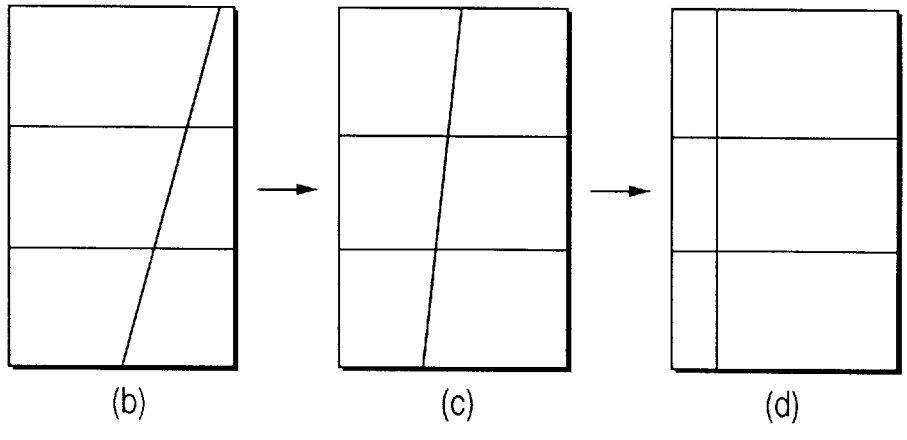

In this manner, the exchange-coupling force acts between the reproducing layer and the recording layer upon irradiation of the medium with PH light, and no exchange-coupling force acts upon irradiation of the medium with PL light. For this reason, the difference between the influences of the effective magnetic fields by the exchange-coupling force upon irradiation of the medium with PL light and PH light can be rendered more distinct, and hence, reliable overwrite recording can be realized. FIG. 7 is a view showing the transitions of magnetization states when the intermediate layer is arranged, and FIG. 8 is a graph showing the temperature in the direction of film thickness.

Figure 9:
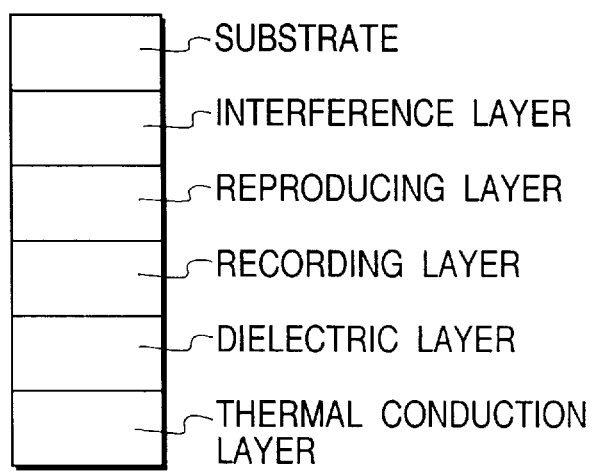
FIG. 9 is a sectional view showing an example of the layer structure of the magneto-optical recording medium of the present invention.
Figure 10:
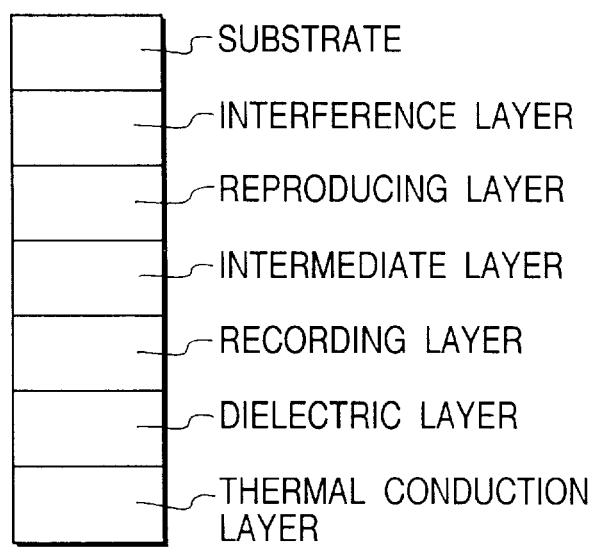
FIG. 10 is a sectional view showing another example of the layer structure of the magneto-optical recording medium of the present invention.
Figure 11B:
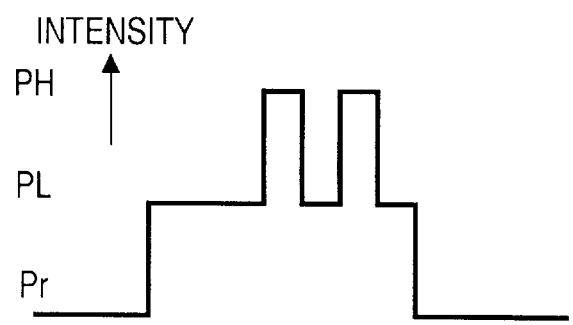
Figure 11C:
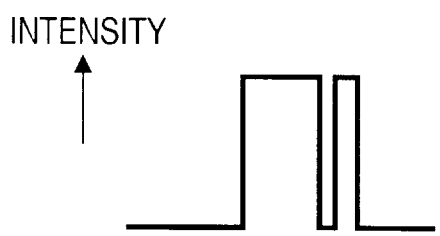
Figure 11D:
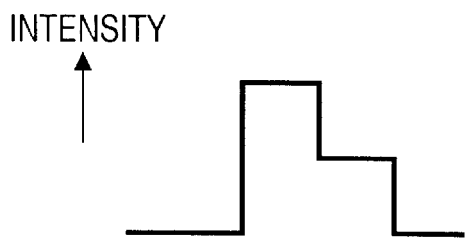
Figure 12:
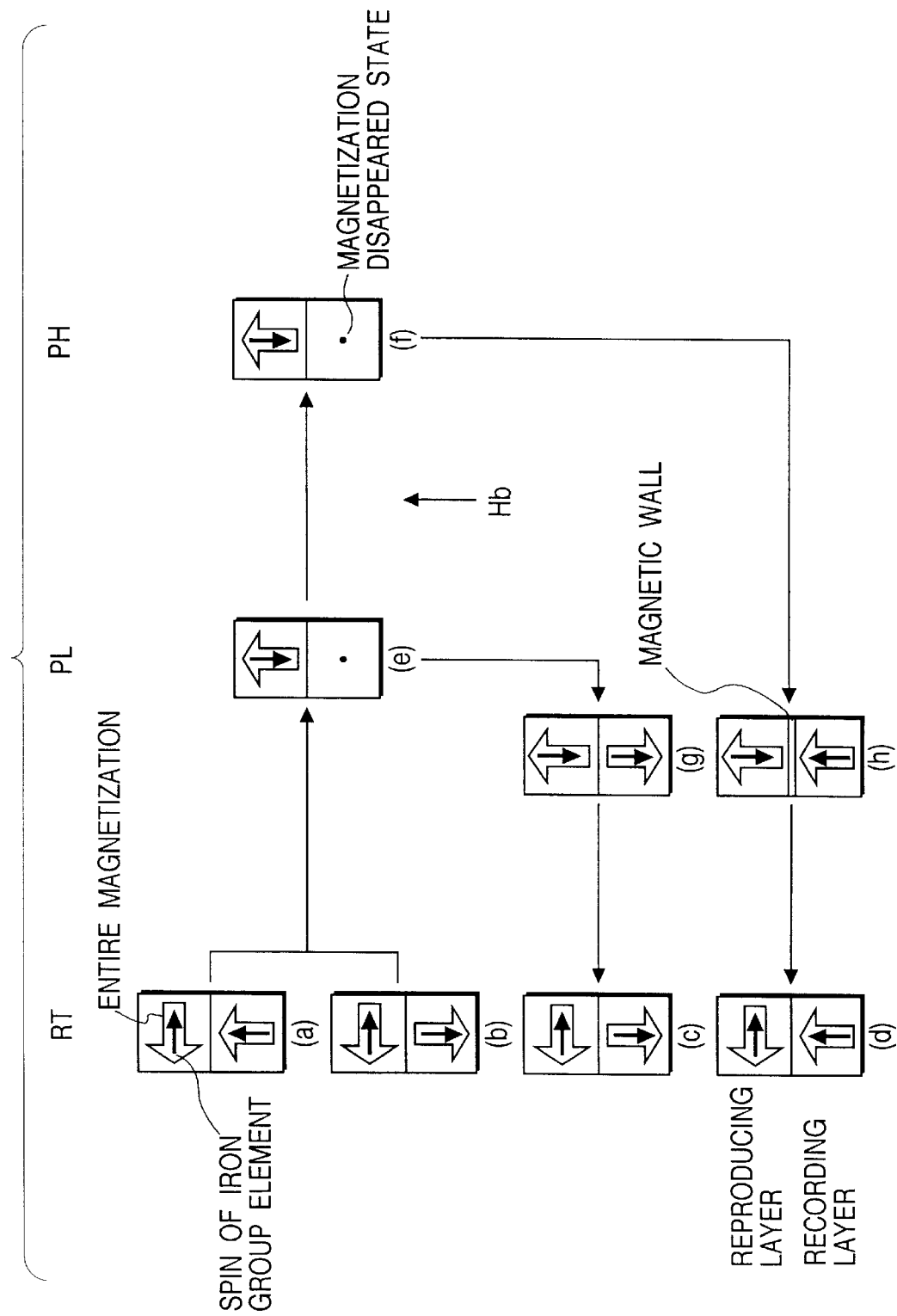
FIG. 12 is a view showing a change in the state of magnetization upon information recording in still another example of the magneto-optical recording medium of the present invention.
Figure 13:
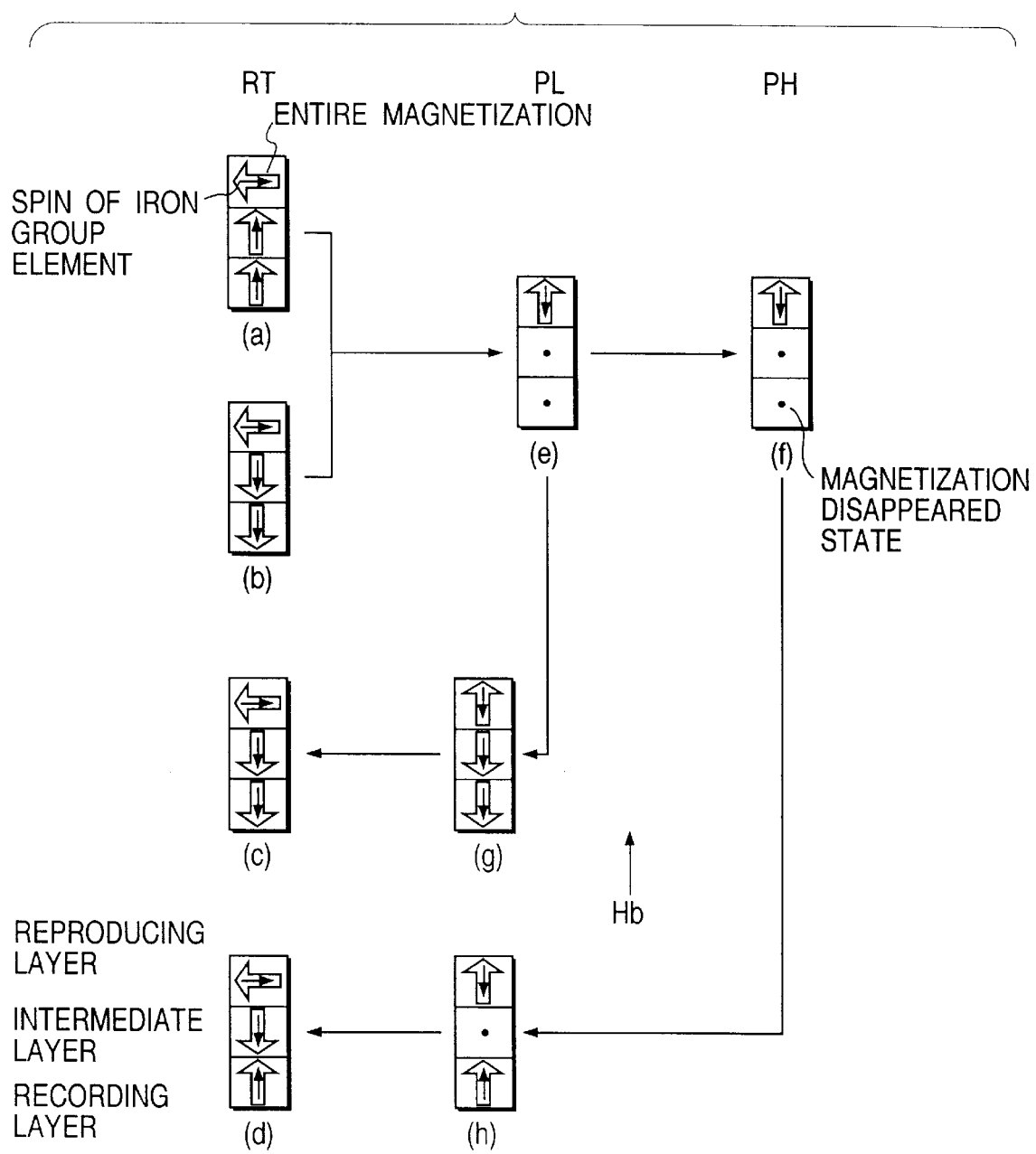
FIG. 13 is a view showing a change in state of magnetization upon information recording in still another example of the magneto-optical recording medium of the present invention.

In the above description, TH is lower than TL. However, TH may be set to be higher than TL if the film thickness of each magnetic layer is decreased as much as possible, and heat is allowed to diffuse sufficiently in the direction of the film thickness by arranging a thermal conduction layer at a side opposite to the light incidence side of the magnetic layers or by setting the moving speed of the light beam to be lower than the heat diffusion speed, as shown in FIGS. 9 and 10, and if PH light irradiates the medium as a time pulse beam, as shown in Fig. 11B, new pulse light irradiates the medium within a short period of time after irradiation, as shown in FIG. 11C, or PH light irradiates the medium stepwise, as shown in Fig. 11D. In this case, the magnetization of the recording layer is exchange-coupled to the reproducing layer upon irradiation of the medium with PL light, and its direction is oriented in the direction of the bias magnetic field upon irradiation of the medium with PH light, opposite to the case described above. Therefore, the overwrite processing based on optical modulation can be achieved, as shown in FIGS. 12 and 13, except that the direction of magnetization of the recording layer generated after irradiation of the medium with PL light and PH light is opposite to that in the above-mentioned case.

The present invention will be described in more detail below by way of its experimental examples. However, the present invention is not limited to these experimental examples.

(EXPERIMENTAL EXAMPLE 1)

Si, Gd, Tb, Fe, Co, and Dy targets were attached to a DC magnetron sputtering apparatus, and a glass substrate having a diameter of 130 mm and a polycarbonate substrate with pregrooves were fixed to a substrate holder arranged at a position separated from the targets by a distance of 150 mm. Thereafter, the interior of a chamber was evacuated by a cryopump to a high vacuum of $1 \times 10^{-5}$ Pa or less.

Figure 14:
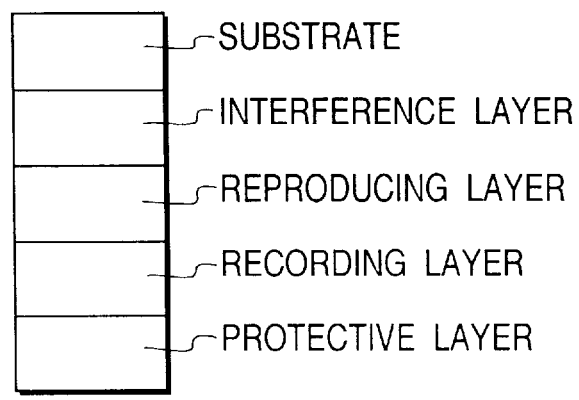
FIG. 14 is a sectional view showing still another example of the layer structure of the magneto-optical recording medium of the present invention.

During vacuum evacuation, Ar gas was supplied into the chamber to 0.4 Pa, and thereafter, an 800-Å thick SiN dielectric layer, a 400-Å thick GdFeCo reproducing layer, a 400-Å thick TbFeCo recording layer, and a 700-Å thick SiN protective layer were formed in the order named to obtain a sample with the arrangement shown in FIG. 14. Upon formation of each SiN layer, $N_2$ gas was supplied in addition to Ar gas, and the film was formed by DC reactive sputtering. In this case, the mixing ratio of the Ar gas and $N_2$ gas was adjusted to obtain a refractive index of 2.15.

The composition of the GdFeCo reproducing layer was selected to be RE rich at room temperature, and to have a compensation temperature of 240° C. and a Curie temperature of 300° C. or higher.

The composition of the TbFeCo recording layer was selected to be TM rich at room temperature, and to have a Curie temperature of 180° C.

The recording/reproduction characteristics were measured using this magneto-optical recording medium. In an evaluation apparatus, the N.A. of an objective lens was set to be 0.55, the laser wavelength was set to be 780 nm, and the linear velocity was set to be 9 m/s.

Before measurement, a magnetic field of 5,000 Oe was applied in the erasing direction, and thereafter, a magnetic field of 500 Oe was applied in the recording direction, thereby recording a signal of 7.5 Mhz by recording power of 13 mW to have a mark length of 0.60 μm. After recording, the power of PL light was set to be 7 to 8 Mw, the power of PH light was set to be 10 to 13 Mw, and a signal of 5.8 Mhz was overwrite-recorded by the optical modulation method to have a mark length of 0.78 μm while applying a bias magnetic field of 800 Oe. After recording, the reproducing power was set to fall within a range from 2.4 to 3.0 Mw, and the C/N ratio of the new signal of 5.8 Mhz was measured. Then, the recording frequency was changed to 9.8 Mhz, a signal having a mark length of 0.46 μm, which was equal to or smaller than the diffraction limit, was recorded, and the C/N ratio was similarly measured. Also, the C/N ratio of the old signal of 7.5 Mhz was measured.

Table 1 shows the measurement results.

(EXPERIMENTAL EXAMPLE 2)

Using the same apparatus and method as in Experimental Example 1, an 800-Å thick SiN dielectric layer, a 400-Å thick GdTbFeCo reproducing layer, a 400-Å thick TbFeCo recording layer, and a 700-Å thick SiN protective layer were formed on a polycarbonate substrate in the order named, thus obtaining a sample with the arrangement shown in FIG. 14.

The composition of the GdTbFeCo reproducing layer was selected to be RE rich at room temperature, and to have a compensation temperature of 235° C. and a Curie temperature of 300° C. or higher.

The composition of the TbFeCo recording layer was selected to be TM rich at room temperature, and to have a Curie temperature of 200° C.

The recording/reproduction characteristics of this magneto-optical recording medium were evaluated as in Experimental Example 1. Table 1 shows the evaluation results.

(EXPERIMENTAL EXAMPLE 3)

Using the same apparatus and method as in Experimental Example 1, a 900-Å thick SiN dielectric layer, a 400-Å thick GdDyFeCo reproducing layer, a 300-Å thick TbFeCo recording layer, and a 700-Å thick SiN protective layer were formed on a polycarbonate substrate in the order named, thus obtaining a sample with the arrangement shown in FIG. 14.

The composition of the GdDyFeCo reproducing layer was selected to be RE rich at room temperature, and to have a compensation temperature of 225° C. and a Curie temperature of 300° C. or higher.

The composition of the TbFeCo recording layer was selected to be TM rich at room temperature, and to have a Curie temperature of 185° C.

The recording/reproduction characteristics of this magneto-optical recording medium were evaluated as in Experimental Example 1. Table 1 shows the evaluation results.

(EXPERIMENTAL EXAMPLE 4)

Figure 15:
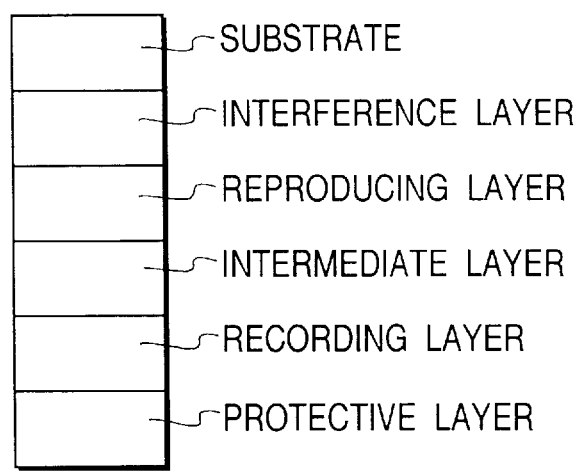
FIG. 15 is a sectional view showing still another example of the layer structure of the magneto-optical recording medium of the present invention.

Using substantially the same apparatus and operations as in Experimental Example 1, except that a 50-Å thick GdFeCo intermediate layer was formed between the reproducing layer and the recording layer, a magneto-optical recording medium with the arrangement shown in FIG. 15 was prepared.

The composition of the GdFeCo reproducing layer was selected to be RE rich at room temperature, and to have a compensation temperature of 250° C. and a Curie temperature of 300° C. or higher.

The composition of the GdFeCo intermediate layer was selected to be RE rich at room temperature, and to have a Curie temperature of 190° C.

The composition of the TbFeCo recording layer was selected to be TM rich at room temperature, and to have a Curie temperature of 208° C.

Using this magneto-optical recording medium, the C/N ratio of the new signal of 5.8 Mhz and the C/N ratio of the old signal of 7.5 Mhz were measured following the same procedures as in Experimental Example 1.

Thereafter, a signal of 9.8 Mhz was similarly recorded by the optical modulation overwrite method to have a mark length of 0.46 μm, and the C/N ratios of the new and old signals were measured.

Table 1 shows the measurement results.

(EXPERIMENTAL EXAMPLE 5)

Using the same apparatus and method as in Experimental Example 4, an 800-Å thick SiN dielectric layer, a 400-Å thick GdTbFeCo reproducing layer, a 60-Å thick GdFeCo intermediate layer, a 400-Å thick TbFeCo recording layer, and a 700-Å thick SiN protective layer were formed on a polycarbonate substrate in the order named, thus obtaining a sample with the arrangement shown in FIG. 15.

The composition of the GdTbFeCo reproducing layer was selected to be RE rich at room temperature, and to have a compensation temperature of 250° C. and a Curie temperature of 300° C. or higher.

The composition of the GdFeCo intermediate layer was selected to be RE rich at room temperature, and to have a Curie temperature of 195° C.

The composition of the TbFeCo recording layer was selected to be TM rich at room temperature, and to have a Curie temperature of 220° C.

The recording/reproduction characteristics of this magneto-optical recording medium were evaluated as in Experimental Example 4. Table 1 shows the evaluation results.

(EXPERIMENTAL EXAMPLE 6)

Using the same apparatus and method as in Experimental Example 4, a 900-Å thick SiN dielectric layer, a 400-Å thick GdDyFeCo reproducing layer, a 100-Å thick GdFeCo intermediate layer, a 300-Å thick TbFeCo recording layer, and a 700-Å thick SiN protective layer were formed on a polycarbonate substrate in the order named, thus obtaining a sample with the arrangement shown in FIG. 15.

The composition of the GdDyFeCo reproducing layer was selected to be RE rich at room temperature, and to have a compensation temperature of 290° C. and a Curie temperature of 300° C. or higher.

The composition of the GdFeCo intermediate layer was selected to be RE rich at room temperature, and to have a Curie temperature of 210° C.

The composition of the TbFeCo recording layer was selected to be TM rich at room temperature, and to have a Curie temperature of 250° C.

The recording/reproduction characteristics of this magneto-optical recording medium were evaluated as in Experimental Example 4. Table 1 shows the evaluation results.

(COMPARATIVE EXAMPLE 1)

Using the same apparatus and method as in Experimental Example 1, a 900-Å thick SiN dielectric layer, an 800-Å thick TbFeCo recording/reproducing layer, and a 700-Å thick SiN protective layer were formed in the order named on a glass substrate, thus obtaining a magneto-optical recording medium. The refractive index of each SiN layer was set to be 2.1.

The composition of the TbFeCo recording/reproducing layer was selected to be TM rich at room temperature, and to have a saturation magnetization of 200 emu/cc and a Curie temperature of 220° C.

The recording/reproduction characteristics of this magneto-optical recording medium were evaluated as in Experimental Example 1. Table 1 shows the evaluation results.

TABLE 1

| | Recording Frequency of New Signal | | | |
| --- | --- | --- | --- | --- |
| | 5.8 MHz | | 9.8 MHz | |
| Reproduced Signal Unit | New Signal C/N dB | Old Signal C/N dB | New Signal C/N dB | Old Signal C/N dB |
| Experimental Example 1 | 48 | 5 | 40 | 5 |
| Experimental Example 2 | 49 | 6 | 41 | 5 |
| Experimental Example 3 | 49 | 4 | 39 | 6 |
| Experimental Example 4 | 48 | 2 | 43 | 2 |
| Experimental Example 5 | 49 | 1 | 42 | 2 |
| Experimental Example 6 | 49 | 3 | 43 | 1 |

TABLE 1-continued

| | Recording Frequency of New Signal | | | |
|---|---|---|---|---|
| | 5.8 MHz | | 9.8 MHz | |
| Reproduced Signal Unit | New Signal C/N dB | Old Signal C/N dB | New Signal C/N dB | Old Signal C/N dB |
| 6 Comparative Example 1 | 19 | 22 | 8 | 21 |

(old signal = 7.5 MHz)

As can be seen from this table, upon comparison between the characteristics of the magneto-optical recording media of the present invention of Experimental Examples 1 to 6 with those of the conventional magneto-optical recording medium of Comparative Example 1, optical modulation overwrite can be realized and at the same time, a signal with a small mark length can be satisfactorily reproduced in the media of the present invention.

Using the magneto-optical recording medium and the recording/reproduction method of the present invention, recording based on optical modulation overwrite and reproduction of a magnetic domain smaller than the beam spot size can be realized using a simple apparatus with no initialization magnet without complicating the layer structure of the medium, thus achieving high-density recording.

What is claimed is:

1. An information recording method for recording information on a magneto-optical recording medium using a light beam, the magneto-optical recording medium comprising:

a transparent substrate;

a first magnetic layer supported by the substrate, the first magnetic layer being in an in-plane magnetization state at room temperature and being in a perpendicular magnetization state when the temperature of the first magnetic layer is within a predetermined temperature range between room temperature and the Curie temperature of the first magnetic layer; and a second magnetic layer supported by the first magnetic layer, the second magnetic layer having a Curie temperature higher than room temperature and lower than the Curie temperature of the first magnetic layer, the second magnetic layer being in a perpendicular magnetization state when the temperature of the second magnetic layer is between room temperature and the Curie temperature of the second magnetic layer, wherein a direction of magnetization of the first magnetic layer is anti-parallel to a direction of magnetization of the second magnetic layer when the first and second magnetic layers are in their perpendicular magnetization states, said method comprising the steps of:

moving the medium;

applying a bias magnetic field having an intensity Hb to a portion of the medium using bias magnetic field applying means; and selectively irradiating the portion of the medium to which the bias magnetic field is applied with one of a first kind of light beam and a second kind of light beam, using an optical head, in accordance with information to be recorded, wherein (a) the first kind of light beam has an intensity that raises the temperature of the medium to a temperature T1 that is higher than the Curie temperature of the second magnetic layer and falls within the predetermined temperature range, wherein the second magnetic layer loses its magnetization when its temperature rises above its Curie temperature, the magnetization of the first magnetic layer becomes oriented in a direction of the bias magnetic field at the temperature T1 and, when the temperature of the second magnetic layer cools to its Curie temperature and the second magnetic layer regains its magnetization, (i) the condition $\sigma_w/(2Ms_2-h_2) -Hc_2 < Hb$ is satisfied, where $\sigma_w$ is a magnetic wall energy between the first and second magnetic layers, $Ms_2$ is the saturation magnetization of the second magnetic layer, $h_2$ is the film thickness of the second magnetic layer, and $Hc_2$ is the coercive force of the second magnetic layer, and (ii) the magnetization of the second magnetic layer becomes oriented in the direction of the bias magnetic field, and the second magnetic layer retains its magnetization state while its temperature thereafter cools to room temperature, and (b) the second kind of light beam has an intensity that raises the temperature of the medium to a temperature T2 that falls within the predetermined temperature range and that is higher than the temperature T1, wherein the second magnetic layer loses its magnetization when its temperature rises above its Curie temperature, the magnetization of the first magnetic layer becomes oriented in a direction of the bias magnetic field at the temperature T2 and, when the temperature of the second magnetic layer cools to its Curie temperature and the second magnetic layer regains its magnetization, (i) the condition $\sigma_w/(2Ms_2-h_2) -HC_2 > Hb$ is satisfied, and (ii) the magnetization of the second magnetic layer becomes oriented in a direction that is anti-parallel to the direction of the magnetization of the first magnetic layer through an exchange-coupling force, and the second magnetic layer retains its magnetization state while its temperature thereafter cools to room temperature.

2. A method according to claim 1, wherein a change in magnetization state resulting from irradiation of the medium with one of the first kind of light beam and the second kind of light beam occurs only in a high temperature portion inside a light spot formed on the medium by the light beam.

* * * * *

UNITED STATES PATENT AND TRADEMARK OFFICE
CERTIFICATE OF CORRECTION

PATENT NO. : 5,774,429
DATED : June 30, 1998
INVENTOR(S) : NAOKI NISHIMURA

It is certified that error appears in the above-identified patent and that said Letters Patent is hereby corrected as shown below:

Column 1

Line 20, "magnetic," should read --magnetic--.

Column 2

Line 35, "the" should read --as the--.

Column 3

Line 48, "to" should be deleted.

Column 6

Line 51, "spot. When" should read --spot. ¶ When--.

UNITED STATES PATENT AND TRADEMARK OFFICE
CERTIFICATE OF CORRECTION

PATENT NO. : 5,774,429
DATED : June 30, 1998
INVENTOR(S) : NAOKI NISHIMURA

It is certified that error appears in the above-identified patent and that said Letters Patent is hereby corrected as shown below:

<u>Column 8</u>

Line 6, "smaller that" should read --smaller than that--

<u>Column 11</u>

Line 5, "700-Åthick" should read --700-Å thick--.

Signed and Sealed this

Twenty-fourth Day of August, 1999

Attest:

Q. TODD DICKINSON

*Attesting Officer*    Acting Commissioner of Patents and Trademarks